US009691111B2

(12) United States Patent
Ree

(10) Patent No.: US 9,691,111 B2
(45) Date of Patent: Jun. 27, 2017

(54) SYSTEMS, METHODS, AND APPARATUS FOR DETERMINING ENERGY SAVINGS

(75) Inventor: Bradley Richard Ree, Cumming, GA (US)

(73) Assignee: Aclara Meters LLC, Hazelwood, MO (US)

(*) Notice: Subject to any disclaimer, the term of this patent is extended or adjusted under 35 U.S.C. 154(b) by 574 days.

(21) Appl. No.: 13/345,335

(22) Filed: Jan. 6, 2012

(65) Prior Publication Data

US 2013/0178995 A1 Jul. 11, 2013

(51) Int. Cl.
*G06F 19/00* (2011.01)
*G06Q 50/06* (2012.01)

(52) U.S. Cl.
CPC .................................... *G06Q 50/06* (2013.01)

(58) Field of Classification Search
CPC .................................. H02J 3/14; G06Q 50/06
USPC ................................ 700/297, 298, 291, 295
See application file for complete search history.

(56) References Cited

U.S. PATENT DOCUMENTS 4,204,127 A * 5/1980 Carter, II ...................... 700/298
5,675,503 A * 10/1997 Moe et al. .................... 700/296
8,260,470 B2 * 9/2012 Forbes, Jr. ............. G06Q 10/00 340/870.02
2003/0227266 A1 * 12/2003 Clark et al. ................... 315/294
2005/0102068 A1 * 5/2005 Pimputkar et al. ........... 700/291
2006/0184288 A1 * 8/2006 Rodgers ................. G01D 4/004 700/295
2009/0240381 A1 * 9/2009 Lane ......................... H02J 3/14 700/296
2010/0088261 A1 * 4/2010 Montalvo ..................... 700/297
2010/0145884 A1 * 6/2010 Paik .............................. 700/295
2010/0179708 A1 * 7/2010 Watson et al. ................ 700/296
2010/0241285 A1 * 9/2010 Johnson et al. .............. 700/296
2010/0312414 A1 * 12/2010 Kumar .......................... 700/295
2010/0328023 A1 * 12/2010 Thomson ...................... 700/295
2011/0035071 A1 * 2/2011 Sun ........................... H02J 3/00 700/291
2011/0181114 A1 * 7/2011 Hodges et al. ................. 307/39
2011/0208360 A1 * 8/2011 Oggianu et al. .............. 700/297
2012/0029897 A1 * 2/2012 Cherian et al. ................. 703/18
2012/0053739 A1 * 3/2012 Brian .................... G06F 1/3203 700/287
2012/0159211 A1 * 6/2012 Kim et al. .................... 713/320
2013/0015703 A1 * 1/2013 Rouse ....................... H02J 3/38 307/18

* cited by examiner

*Primary Examiner* — Michael D Masinick
(74) *Attorney, Agent, or Firm* — Polster, Lieder, Woodruff & Lucchesi, L.C.

(57) ABSTRACT

A system, method, and apparatus for determining energy savings are provided. The method may include repeatedly measuring energy usage of a load, determining that a demand response load control event exists, modifying the cycle of operation based at least in part on determining that a demand response load control event exists, and determining an energy savings based on comparing the measured energy usage of the load with an energy usage statistic. The determining that the demand response load control event exists may include receiving a demand response load control notification. The modifying the cycle of operation may include reducing a power draw of the load.

18 Claims, 3 Drawing Sheets

SYSTEMS, METHODS, AND APPARATUS FOR DETERMINING ENERGY SAVINGS

FIELD OF THE INVENTION

This invention generally relates to power metering, and in particular to determining energy savings.

BACKGROUND OF THE INVENTION

Power distribution systems generally are controlled to match supply of power from power generation units to demand for power from electrical loads on the power distribution system. During periods of time when current demand for power exceeds current supply of power, additional generation units may need to be activated to supply all of the demanded power. If the additional power cannot be supplied, then brownout or blackout conditions may result, where some or all of the loads demanding power are not supplied with demanded power. In general operators of power distribution systems and utility companies try to avoid brownout or blackout conditions.

Power distribution systems may issue a demand response load control (DRLC) command if the system senses or anticipates a power deficit. In other words, the power distribution system may determine based on historical usage if there is likely to be greater demand than supply and if such a condition is anticipated, may issue a DRLC. The DRLC may be transmitted to electrical power consumers and constituent smart loads and smart power controllers throughout the power distribution system. Upon receiving a DRLC, a smart load, such as a smart appliance, may automatically curtail energy usage based on receiving the DRLC. The curtailment may involve changing the appliance cycle of operation, implementing a delayed start, changing a set point, or not operating the appliance. Such a power distribution system is often referred to as a smart grid.

Utility companies, power generators, or power distributors may benefit from having customers curtail energy usage during times of peak loads, as doing so can balance load demand. In other words, when customers curtail energy usage during times of high energy usage based on the utility company sending a DRLC, the power generator may have energy usage that has a reduced peak demand, and possibly an increased through demand. In general, having a more balanced load demand can allow the utility to have a higher overall utilization of their power generating assets and therefore improve their return on invested assets in a generally capital intensive industry.

Utility companies often provide incentives to customers for participating in programs where the utility can have some control in reducing energy usage at the end customer's premises. Such programs may provide financial incentive based on a customer's participation in the program.

BRIEF SUMMARY OF THE INVENTION

Certain embodiments of the invention can provide systems, methods, and apparatus for determination of energy savings, for instance, resulting from a load responding to a demand response load control (DRLC) event. Certain embodiments can include comparing load power consumption during a DRLC event to load power consumption had a DRLC event not been in place to determine energy savings resulting from issuing a DRLC request by a utility. Therefore, a mechanism for auditing the level of power and energy savings during a DRLC event can be provided. Certain embodiments can further include providing incentives to an end customer based on actual or estimated energy savings by the end customer during a DRLC event. In one aspect, upon receiving a DRLC event notification the operating conditions of a load may be modified. In another aspect, the level of power consumption by the load may be determined using one or more sensors. In yet another aspect, the level of energy savings may be recorded in one or more data registers of an element controlling the energy usage of the load. The level of energy savings during a DRLC event may be communicated to a utility company, power generation company or power distribution company. When a DRLC event is not in place, a load controller may log energy usage data and generate usage statistics based thereon.

In one embodiment, a method can include determining that a load is running according to a cycle of operation, repeatedly measuring energy usage of the load, determining that a demand response load control event exists, modifying the cycle of operation based at least in part on the determining that a demand response load control event exists, and determining an energy savings based on comparing the measured energy usage of the load with an energy usage statistic.

In another embodiment, an apparatus can include at least one detector for determining power consumption of a load, a communicative link for receiving a demand response load control notification, a controller for controlling power supplied to the load, and an electronic memory for storing an energy usage statistic. The controller further can change the amount of power supplied to the load based at least in part upon receiving a demand response load control notification and can determine an energy savings of the load based at least in part on the determined power consumption of the load and the energy usage statistic.

In yet another embodiment, a power distribution system can include a power source operable to provide power to a load, and a load controller for controlling the amount of power provided from the power source. The load controller can further include at least one detector for determining power consumption of the load, a communicative link for receiving a demand response load control notification, a controller for controlling power supplied to the load, and an electronic memory for storing an energy usage statistic, wherein the controller changes the amount of power supplied to the load based at least in part on receiving a demand response load control notification, and determines an energy savings of the load based at least in part on the determined power consumption of the load and the energy usage statistic.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Embodiments of the invention are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide apparatus, systems, and methods for determining energy savings, for instance, from a load during a DRLC event. Embodiments of the invention may further enable compensating power consumers for participating in load control programs for balancing the power load based on energy curtailment during peak demand. The determinations of energy savings may entail determining and storing energy usage statistics of a load during non-DRLC events, modifying the operation of a load when a DRLC event occurs, and comparing the energy usage during the modified operation of the load to the energy usage statistics.

Example embodiments of the invention will now be described with reference to the accompanying figures.

Figure 1:
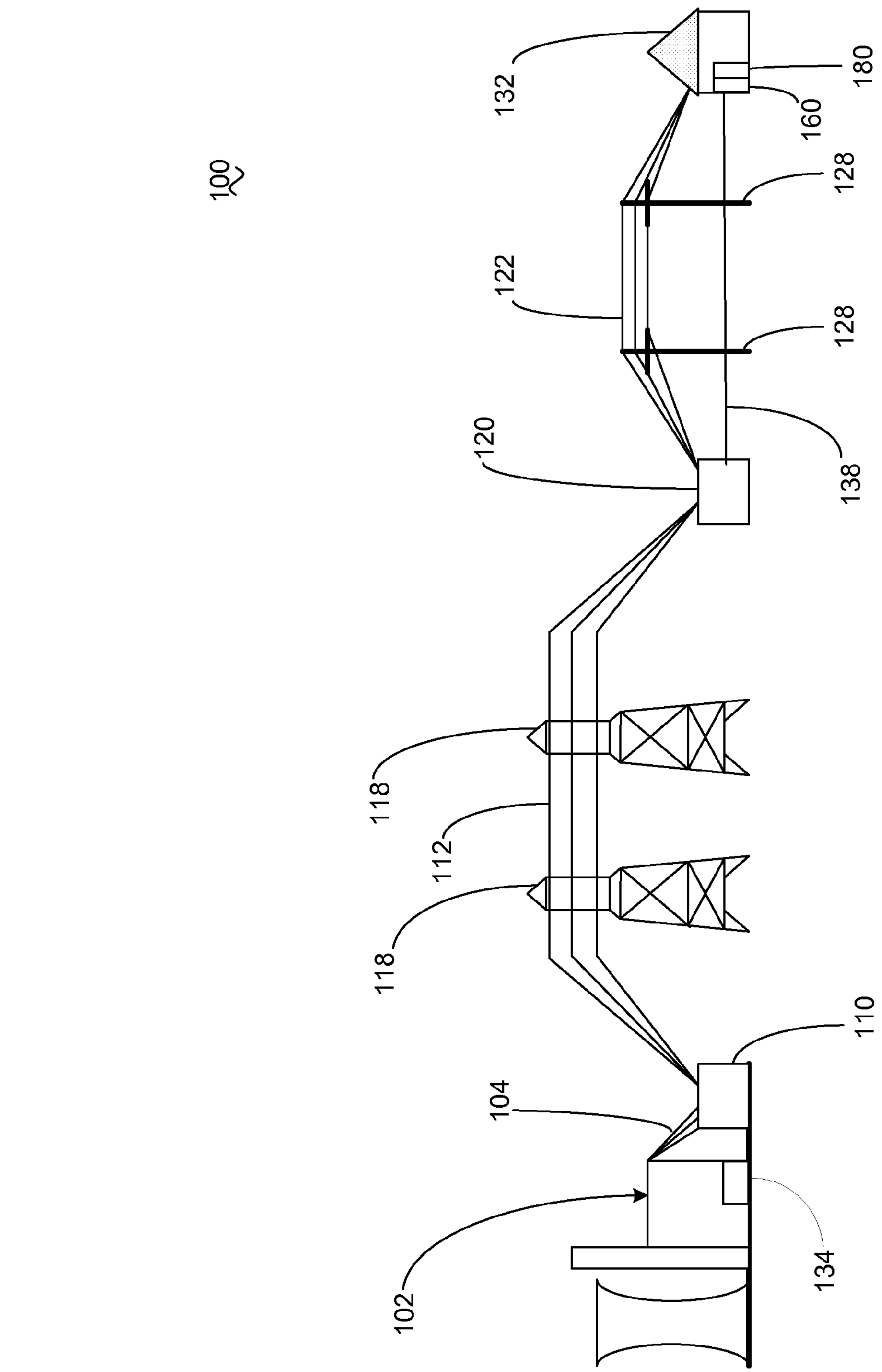
FIG. 1 is a simplified schematic diagram illustrating an example power distribution system with a load and DRLC controller that can be operated according to embodiments of the invention.

Referring now to FIG. 1, a simplified schematic diagram of an example power distribution system 100 that can be operated in accordance to an embodiment of the invention can include a power generation unit 102, supplying electrical power via utility power lines 104 to a step-up transformer 110 that provides high voltage power to high voltage transmission lines 112 carried by high voltage line towers 118. The power distribution system 100 can further include a step-down transformer 120 receiving high voltage power from the high voltage transmission lines 112 and providing electrical power to distribution lines 122 carried by distribution line poles 128 to an end user 132. The end user 132 can further have a load 180 and the electrical power supplied to the load 180 from the distribution lines 122 may be controlled by a DRLC controller 160. The DRLC controller 160 may further have a communicative link 138 that can communicate a DRLC notification to the DRLC controller 160. The power distribution system 100 can further include a DRLC determination controller 134 for determining if a DRLC event notification should be issued for the power distribution system 100 or portions thereof.

It should be noted that FIG. 1 is schematic in nature and although a single power generation unit 102 is depicted, the power distribution system 100 can have multiple utilities or power generation units, providing power from a variety of energy sources. The variety of energy sources may include, but are not limited to, coal, natural gas, hydroelectric, nuclear, solar-thermal, solar photovoltaic, wind, coastal tides, geothermal, hydrogen, or combinations thereof. The power generation unit 102 may provide power to the step-up transformer 110 at a variety of voltages in the range of about 50 volts to about 25000 volts, depending on the source of energy and operational parameters of the generation unit 102. The step-up transformer 110 may provide electrical power and the high voltage transmission lines 112 may transmit electrical power in a voltage range of about 6 kilo-volts (kV) to about 500 kV.

The step down transformer 120 may receive relatively high voltage from the high voltage transmission lines 112 and provide a relatively lower voltage, such as, for example, 120 volts root mean square (Vrms) or 220 Vrms, to the distribution lines 122. In one embodiment, the step-down transformer 120 may be a part of a distribution substation that may include other elements such as, surge protectors and lightning arrestors. In another embodiment, the power distribution system 100 may include multiple step-down transformers geographically spaced from each other and receiving power from the high voltage transmission lines 112.

Although a single end user 132 user is depicted for a simplified and conceptual view of the power distribution system 100, the power distribution system 100 may have a plurality of end users. The end users 132 may be any variety of electrical power consumers, including residential consumers and/or business consumers. In certain embodiments, each end user 132 may have more than one load 180. Further, some loads 180 may have a DRLC controller 160 associated therewith and other loads may not have a DRLC controller 160 associated therewith.

Although the communications link 138 is shown to communicate to the DRLC controller 160 from the step-down transformer 120, the communications link 138 to the end user 132 can be located anywhere. For example, the communication link 138 can be to a power substation, a utility control center, or directly to the DRLC determination controller 134. Furthermore, the communications link 138 can be of any known type including, but not limited to, an RF channel, a direct wired connection, a protocol based link, such as the internet, or combinations thereof.

The DRLC controller 160, in one aspect, may deter mine the amount of power or energy during a period of time that is saved during a DRLC event from a particular electrical load 180. The determined energy savings is often referred to by the term negawatts. In certain embodiments, the determined energy savings, or negawatts, may be communicated back to a utility company or power generator 102. The utility company or power generator 102, in certain embodiments of the invention, may provide incentives to an end user 132 based on the energy savings or negawatts during a DRLC event.

In one aspect, the DRLC determination controller 134 may communicate a DRLC event to a distributed location, such as the step down transformer 120 from where the DRLC event notification is communicated to the end user 132. The DRLC determination controller may communicate a DRLC notification event to a distributed location by a variety of channels including, but not limited to, RF communications, dedicated wired communications, internet communications, or combinations thereof. In other embodiments, the end user may be directly coupled via the communications link 138 to the DRLC determination controller 134 and receive the DRLC event notification from the DRLC determination controller 134.

The DRLC determination controller 134 may make a DRLC determination based upon the current power usage and draw on the power distribution system 100. The DRLC determination controller 134 may compare the current power draw to the current production capacity of the power distribution network 100 and decide to issue a DRLC notification if the current power draw is within a predetermined threshold of the overall power production capacity of the power distribution network 100 and the power generation units 102 thereon. As a non-limiting example, a DRLC notification may be issued by the DRLC determination controller 134 if the power consumption by end users 132 reach about 98% of the peak generation capacity of the power generation units 102 on the power distribution system 100. In other embodiments, the DRLC determination controller 134 may conduct predictive analysis of power consumption based on various data to issue a DRLC notification. As a non-limiting example, the DRLC determination controller 134 may consider weather forecast data and historical statistical power consumption data at various times during the day for a specific weather forecast to determine if a DRLC event should be instituted. In yet other embodiments, a variety of methods may be used to make a DRLC event determination.

The power distribution system 100, therefore can have the ability to communicate a power savings mode or DRLC message to end users 132, and in particular loads 180 on the power distribution network 100 to curtail power usage during certain specified peak power usage times. In response, loads 180 on the power distribution system 100 may curtail power consumption during the identified peak load times and thereby reduce energy consumption during the peak load times. The curtailment of power consumption can be from, for example, modifying the cycle of operation of the load 180, delaying the operation of the load 180, or not running the load 180 at all during the DRLC event. In one aspect, the control of the load during a DRLC event may be via the DRLC controller 160. When a DRLC controller 160 may further determine the total power draw reduction during the DRLC event or the negawatts and the associated energy savings during that time from the corresponding load 180. Such a determination may be made by measuring the power supplied to the load 180 during a DRLC event and then comparing that measurement to statistical data or models of power draw by the same load 180 for operation during non-DRLC events. The DRLC controller 160 may also collect power usage data of the load 180 during non-DRLC events and generate statistics based thereon. Such statistics may be used by the DRLC controller 160 at a later time to determine energy savings from the load 180 during a DRLC event.

Figure 2:
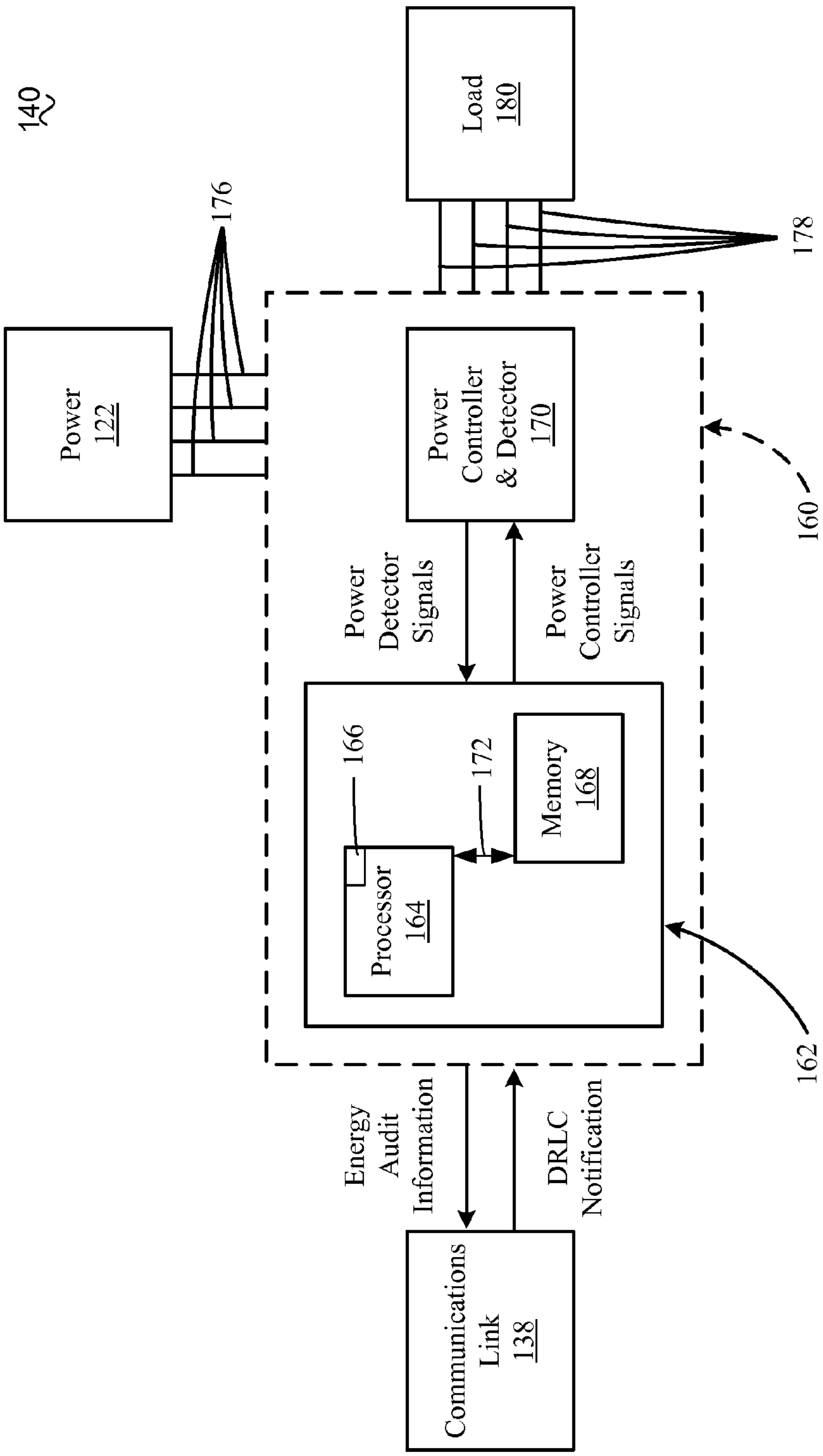
FIG. 2 is a block diagram illustrating an example DRLC controller according to embodiments of the invention.

Referring now to FIG. 2, an example DRLC system 140 with DRLC controller 160 according to an embodiment of the invention can include an energy control module 162 and a power controller and detector 170. The DRLC controller 160 can receive electrical power 130 from the one or more electrical distribution lines 122 via one or more electrical power input lines 176. Electrical power can be provided to the electrical load 180 from the DRLC controller 160 via one or more electrical power output lines 178 to the load 180. The DRLC controller 160, and more particularly the energy control module 162 may be communicatively coupled with the communications link 138. The energy control module 162 may include one or more processors 164 and one or more computer readable electronic memories 168 communicatively coupled to the processors 164 via communications bus 172. The processor 164 may further include one or more registers, such as a negative time of use (TOU) register 166 for storing data, such as data pertaining to energy savings from a load 180 during a DRLC event.

The power controller and detector 170 may include one or more passive devices and/or active devices to control the draw of power via the electrical power input lines 176 and the output of power via the electrical power output lines 178. The power supplied to the load 180 via the electrical power output lines 178 by the power controller and detector 170 may be controlled power controller signals that are input to the power controller and detector 170. The power controller and detector 170 may further include meters for determining the amount of power supplied to the load 180. For example, any number of known meters including, but not limited to, ammeters, volt meters, and power meters may be used to determine the amount of power and thereby the energy supplied to the load 180.

In certain embodiments, multiphase power, such as, for example three phase power, where each phase is separated from each other by approximately 120 degrees, may be received from the power distribution lines 122 via the electrical power input lines 176. The power controller and detector 170 may control the power draw from all or some of the phases that are provided to the DRLC controller 160. Furthermore, multi-phase power may be provided to the load 180 via the electrical power output lines 178. The power controller and detector 170 may control the power output to all or some of the phases that are provided to the load 180 from the DRLC controller 160.

In operation, the DRLC controller 160 may receive a DRLC event notification via the communications link 138. In particular, the DRLC event notification may be received by the processor 164 of the energy control module 162. Upon receiving the DRLC notification from the communications link 138, the processor 164 may generate power control signals based upon the DRLC event notification and provide the same to the power controller and detector 170. The power controller signal may command the power controller and detector 170 to modify the cycle of operation of the load 180, delay the operation of the load 180, or not operate the load 180 during the DRLC event. Therefore, based on the power controller signals received by the power controller and detector 170, the power delivered from the electrical power input lines 176 to the electrical power output lines 178 may be curtailed.

During the DRLC event, the power controller and detector 170 may further measure the power provided to the load 180 and provide that as a power detector signal to the energy control module 162. The energy control module 162 and the processor 164 in particular may use the power detector signal from the power controller and detector and determine an energy savings, or negawatts, based on the power detector signal. In certain embodiments, the processor may receive energy consumption statistics from the memory 168 via the communication bus 172 and compare the power detector signal to the energy consumption statistics to determine the energy savings during the DRLC event. The energy savings during the DRLC event may be periodically updated in the negative TOU register 166. In certain embodiments, the energy savings from the load 180 during the DRLC event as recorded in the negative TOU register 166 may be periodically reported to the utility company via the communications link 138.

The DRLC controller 160 may receive a notification that a DRLC event no longer exists at a time subsequent to the when the DRLC event was instated. Such a notification may prompt the energy control module 162 to generate power control signals and provide the same to the power controller and detector 170 to command the load to operate according to normal, non-DRLC conditions. The processor may further stop incrementing the energy savings as a result of the DRLC event in the TOU register. In certain embodiments, the contents of the negative TOU register 166 may be communicated via the communications link 138 upon ending of a DRLC event. Such audits and indications of the energy savings from a DRLC event may be used by a utility company or the power generator 102 to provide value or compensation to the end user 132 for compliance with the DRLC event.

As a non-limiting example, consider the operation of an air conditioner. Under a non-DRLC event, the thermostat of the air conditioner may be set at 72 degrees Fahrenheit (F). If a DRLC notification is received by the DRLC controller, the DRLC controller 160 may modify the operation of the air conditioner and set the thermostat at 78 degrees F. If the DRLC controller 160 determines that the temperature is above 72 degrees F. in the region to be cooled, but less than 78 degrees F., the DRLC controller may record energy savings accordingly. In such a case, the energy savings are a result of a change in the cycle of operation of the air conditioner, where the air conditioner is not operated until the temperature of the region to be cooled reaches 78 degrees F. When the DRLC event ends, the DRLC controller may again set the thermostat at 78 degrees F., and report the level of energy savings during the DRLC event via the communications link 138 as stored on the negative TOU register 166.

In another non-limiting example, and outdoor light may be plugged into a DRLC controller 160, such that the DRLC controller 160 does not provide power to the outdoor light when a DRLC event is in place. In this case, the load is not operated during the DRLC event. As a result of not operating the load, the DRLC controller 160 may record and update energy savings in the negative TOU register 166. The energy savings during the DRLC event may periodically be reported to a utility company via communications link 138.

When a DRLC event is not in effect, the energy control module 162 may still receive power detector signals from the power controller and detector 170 and use the power consumption information to update the statistics for normal operation without a DRLC event for the load 180. These statistics that are used to determine energy savings during a DRLC event may be updated over time and may change over time. For example, as load, such as an appliance ages the amount of power consumption may drift. As a non-limiting example, the efficiency and therefore the power consumption of an air conditioner may change over time depending on the quantity and quality of the compressible fluid, such as R-134a, used in the operation of the air conditioner. Therefore, updated statistics of power usage of the load during non-DRLC conditions can lead to more accurate and/or more precise quantification of power savings due to a modification in the cycle of operation of the load.

It should also be noted, that the layout of the DRLC controller 160 may be modified in various ways in accordance with certain embodiments of the invention. For example, in certain embodiments, one or more functional blocks may be eliminated or substituted with equivalent or nearly equivalent functional blocks. Additionally, in other embodiments, other elements may be added to or present in the DRLC controller 160.

Figure 3:
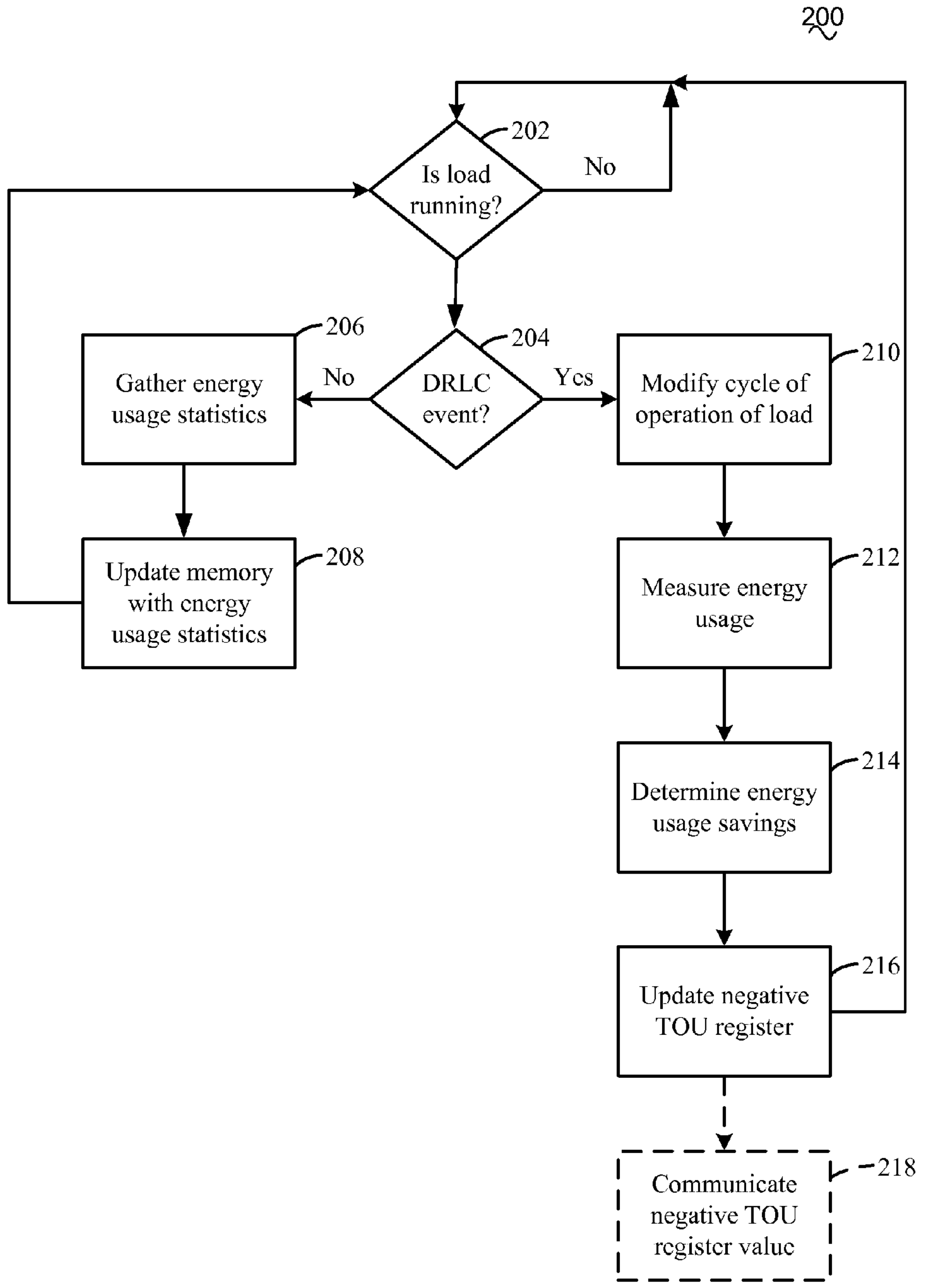
FIG. 3 is a flow diagram of an example method for operating an electrical load according to embodiments of the invention.

Referring now to FIG. 3, an example method 200 for operating a load according to embodiments of the invention is disclosed. At block 202, it is determined if a load is running. The determination of the operation of the load may be made by a DRLC controller 160 as described in reference to FIG. 2. If it is determined that the load is not running at block 202, then the method 200 loops back to repeatedly monitor if the load is running at block 202. If it is determined that the load is running at block 202, then it is next determined if a DRLC condition exists at block 204. A DRLC event may be known due to a DRLC notification message sent to the DRLC controller 160 via communications link 138, as described in conjunction with FIGS. 1 and 2. If at block 204 it is determined that a DRLC event does not exist, then energy usage statistics may be gathered at block 206. The energy usage statistics may further be used to update the memory at block 208. In other words, as the load 180 operates according to a user selection in a non-DRLC event situation, the power controller and detector 170 may monitor the load and measure the power supplied to the load and provide the power consumption data to the energy control module 162. The processor 164 of the energy control module 162 may store the energy usage statistic in memory 168 for accessing by the processor 164 when needed, such as during a DRLC event. After updating the memory with energy usage statistics at 208, the method may return to block 202 to determine if the load is running.

Continuing with FIG. 3, if at block 204 it is determined that a DRLC event exists, then the cycle of operation of the load may be modified at block 210. The energy usage of the load 180 when the cycle of operation is modified may be different than if the cycle of operation was not modified. In certain embodiments, modifying the cycle of operation of the load 180 may entail, operating an alternate cycle of operation that consumes less power than the original cycle of operation. In certain other embodiments, modifying the cycle of operation of the load 180 may entail delaying the operation of the load 180. For example, the load 180 may be operated after the DRLC event no longer exists. In yet other embodiments, modifying the cycle of operation may entail not running the load 180.

After the operation cycle of the load has been modified at block 210, the energy usage of the load can be measured at block 212. The energy usage can be measured by the power controller and detector 170 and communicated to the energy module 162 as described in reference to FIG. 2. Next, the energy usage savings can be determined at block 214. The energy usage savings can be determined by the processor 164 based upon the load energy statistics stored on the memory 168 and the power detector signals provided by the power controller and detector 170. The energy savings as determined in block 214 can be used to update the negative TOU register at block 216. Optionally, the contents of the negative TOU register may be communicated at block 218. The communication of the negative TOU register 166 information pertaining to energy savings during a DRLC event may be communicated to a utility company.

It should be noted, that the method 200 may be modified in various ways in accordance with certain embodiments of the invention. For example, one or more operations of method 200 may be eliminated or executed out of order in other embodiments of the invention. Additionally, other operations may be added to method 200 in accordance with other embodiments of the invention.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for determining energy power savings for a load under certain weather conditions comprising:

determining, by a load controller operating at an end user location, that a load is running in a predetermined manner, the load controller being operatively connected to both the load and to power transmission lines by which power from a power distribution system of a power utility is supplied to the load;

repeatedly measuring, by the load controller, energy usage of the load;

determining, by a demand response load control (DRLC) determination controller associated with the power distribution system, that, by predictive analysis based on current weather forecast data obtained at time intervals during a day, historical statistical power consumption data associated with the load for past weather conditions and related to the current weather forecast data for corresponding time intervals, and current power usage information, that either a power savings mode or a DRLC event should be initiated, the DRLC determination controller, upon reaching said determination of a power savings mode or DRLC event, notifying the load controller for the end user location;

the load controller for the end user location, upon receiving said notification, modifying operation of the load by modifying the load's cycle of operation if the load is in operation, delaying a start in the load's operation if the load is not already in operation, once the load is in operation if the load is allowed to operate or, if the load is already in operation, changing a set point which would allow the load to otherwise draw more power, and including performing all of these actions, thereby reducing a power draw of the load so the load consumes less power than if there were no power saving mode or DRLC event;

the DRLC determination controller, upon determining that said power saving mode or DRLC event is over, notifying the load controller for the end user location;

calculating, by the load controller, a resultant energy savings by comparing measured energy usage by the load during the power savings mode or DRLC event with energy usage statistics for power consumption of the load when no power saving mode or DRLC event had occurred during a period of similar weather forecast conditions for corresponding time intervals; and transmitting by the load controller the calculated energy savings over a communications link to the power utility.

2. The method of claim 1, wherein the determining that current operation of the load comprises measuring at least one of the load's current and voltage by the load controller at the end user location.

3. The method of claim 1, wherein repeatedly measuring energy usage by the load comprises repeatedly measuring at least one current and at least one voltage by the load controller at the end user location.

4. The method of claim 1, wherein modifying the cycle of operation of the load comprises reducing the power drawn by the load to substantially zero.

5. The method of claim 1, wherein the energy usage statistic is based, at least in part, on the repeatedly measured energy usage of the load when no power saving mode or DRLC event exists.

6. The method of claim 1, further comprising updating a negative time of use register based upon the energy savings.

7. The method of claim 6, further comprising storing information on the negative time of use in a memory of the load controller at the end user location.

8. The method of claim 1, further comprising the DRLC determination controller transmitting a user notification message to the end user associated end user location that the power savings mode or the DRLC event has been determined by the power utility.

9. An apparatus comprising:

at least one detector determining power consumption of a load;

a communicative link receiving a demand response load control (DRLC) notification or a power saving mode notification from a DRLC determination controller associated with a power distribution system to the load and to which the apparatus is communicatively connected;

a load controller determining that, if the load is running, the load is running according to a predetermined mode of operation and controlling power supplied to the load in accordance therewith; and an electronic memory storing energy usage statistics including historical statistical power consumption data associated with the load for past weather conditions related to a current weather forecast data for corresponding time intervals, wherein the load controller changes the amount of power supplied to the load based, at least in part, on receiving a first notification from the DRLC determination controller indicating that either a power saving mode or a DRLC event has been determined and receiving a second notification from the DRLC determination controller indicating that the power saving mode or DRLC event no longer exists, wherein the DRLC substantially corresponds to the length of the power saving mode or DRLC event, the first notification being generated by the DRLC determination controller based, at least partially, on a determination that current power usage by a plurality of loads is above a predetermined value and a predictive analysis by the DRLC determination controller of anticipated power consumption, wherein the predictive analysis is based, at least partially, on current weather forecast data obtained at time intervals during a day and the historical statistical power consumption data associated with the load for past weather conditions related to the current weather forecast data for corresponding time intervals, and wherein the load controller, upon receiving said notification, changing the amount of power supplied to the load, if the load is currently in operation, to reduce a power draw of the load, or provide an alternate cycle of operation of the load, if the load is in operation, by which the load consumes less power than during a cycle of operation in which no power savings mode or DRLC event has been instated, or delaying a start in the load's operation, if the load is not already in operation, or if the load is already in operation, changing a set point which would otherwise allow the load to draw more power, and including performing all of these actions thereby reducing the power draw by the load wherein the reduced power draw of the load is nonzero if the load is in operation, and the load controller further calculating energy savings of the load based, at least in part, on the determined power consumption of the load during the period of the power savings mode or DRLC event and energy usage statistics of the power consumption of the load when no power savings mode or DRLC event had occurred during a period of similar weather forecast conditions for corresponding time intervals, and transmitting by the load controller the calculated energy savings over the communications link to the power utility.

10. The apparatus of claim 9, wherein the load controller changing the amount of power supplied to the load comprises reducing the power draw of the load to nonzero if the load is already in operation at the time of the power saving mode or occurrence of the DRLC event.

11. The apparatus of claim 9, wherein the energy usage statistics are based partly on the determined power consumption of the load prior to receiving the first notification.

12. The apparatus of claim 9, further comprising a negative time of use register that is updated based upon the determined energy savings.

13. The apparatus of claim 12, wherein the communicative link transmitting information on the negative time of use register.

14. A power distribution system comprising:

a power source operable to provide power to a load through a power distribution system;

a demand response load control (DRLC) determination controller operatively connected to both the load and the power distribution system;

a load controller operating at a location of the load and controlling the amount of power provided from the power source;

at least one detector determining power consumption of the load;

a communications link extending between a DRLC determination controller and the load controller, the load controller receiving a first notification from the DRLC determination controller via the communication link indicating that a power savings mode or a DRLC event is instated and receiving a second DRLC notification from the DRLC determination controller via the communication link indicating that the power savings mode or the DRLC event no longer exists, wherein the power savings mode or the DRLC event is associated with an event period, the first notification being generated by the DRLC determination controller based, at least in part, on a determination that current power usage by a plurality of loads is above a predetermined value, and a predictive analysis of anticipated power consumption by loads connected to the power distribution system, and wherein the predictive analysis is based, at least partially, on current weather forecast data obtained at time intervals during a day and historical statistical power consumption data associated with the load for past weather conditions and related to the current weather forecast data for corresponding time intervals;

the load controller determining, if a load is in operation, that the load is running according to a predetermined mode of operation and controlling power supplied to the load; and an electronic memory storing energy usage statistics, wherein, in response to receiving the first notification, the load controller, if the load is in operation, reduces the amount of power supplied to the load by providing an alternate cycle of operation in which the load consumes less power than during a cycle of operation in which no load control event is in effect, or delays a start in the load's operation if the load is not already in operation, or if the load is already in operation or is started into operation by the load controller changes a set point by which the load would otherwise be allowed to draw more power, the reduced power draw on the load being nonzero, and including all of these actions, and the load controller further calculating a resultant energy savings of the load based, at least in part, on the determined power consumption of the load during the period of the power savings mode or the DRLC event and energy usage statistics of the power consumption of the load when no power savings mode or DRLC event has occurred during a period of similar weather forecast conditions for corresponding time intervals, the load controller transmitting the calculated energy savings over the communications link to the power utility.

15. The power distribution system of claim 14, wherein the load controller changing the amount of power supplied to the load comprises reducing the power draw of the load to nonzero if the load is already in operation at the time of the power saving mode or occurrence of the DRLC event.

16. The power distribution system of claim 14, wherein energy usage statistics are based, at least in part, on the determined power consumption of the load prior to receiving the first notification.

17. The power distribution system of claim 14, further comprising a negative time of use register that is updated based upon the determined energy savings.

18. The power distribution system of claim 14 wherein the DRLC determination controller transmitting a user notification message to the end user associated end user location that the power savings mode or the DRLC event has been determined by the power utility.

* * * * *